United States Patent [19]

Posselt et al.

[11] Patent Number: 6,039,021

[45] Date of Patent: Mar. 21, 2000

[54] METHOD AND ARRANGEMENT FOR CONTROLLING AN INTERNAL COMBUSTION ENGINE HAVING LEAN-BURN OPERATION

[75] Inventors: Andreas Posselt, Markgroeningen; Christian Koehler, Erligheim, both of Germany

[73] Assignee: Robert Bosch GmbH, Stuttgart, Germany

[21] Appl. No.: 09/190,949

[22] Filed: Nov. 12, 1998

[30] Foreign Application Priority Data

Nov. 12, 1997 [DE] Germany ............ 197 49 992

[51] Int. Cl.$^7$ ............ F02B 31/00; F02D 43/00
[52] U.S. Cl. ............ 123/306; 123/478
[58] Field of Search ............ 123/306, 308, 123/478

[56] References Cited

U.S. PATENT DOCUMENTS

| | | | |
|---|---|---|---|
| 4,730,587 | 3/1988 | Norota et al. | 123/306 |
| 5,056,491 | 10/1991 | Tsukamoto | 123/308 X |
| 5,190,008 | 3/1993 | Yamasaki et al. | 123/306 |
| 5,575,248 | 11/1996 | Tada | 123/306 X |
| 5,640,939 | 6/1997 | Shimada et al. | 123/306 |

FOREIGN PATENT DOCUMENTS

| | | |
|---|---|---|
| 112 494 | 7/1984 | European Pat. Off. . |
| 36 19 956 | 12/1987 | Germany . |
| 44 18 112 | 12/1994 | Germany . |

*Primary Examiner*—Tony M. Argenbright
*Attorney, Agent, or Firm*—Kenyon & Kenyon

[57] ABSTRACT

An internal combustion engine, which outside of the upper load range is operated with a lean mixture, has a device which sets the fuel-air mixture in the combustion chamber into increased motion. This device is activated as soon as a switchover is made to lean-burn operation, and is deactivated when the change is made from lean-burn operation to stoichiometric operation. To ensure that these switchover operations of the device will influence the engine torque as little as possible, the fuel flow is reduced for a specifiable period of time after the device is switched on, and the fuel flow is increased for a specifiable period of time after the device is switched off.

4 Claims, 1 Drawing Sheet

METHOD AND ARRANGEMENT FOR CONTROLLING AN INTERNAL COMBUSTION ENGINE HAVING LEAN-BURN OPERATION

FIELD OF THE INVENTION

The present invention relates to a method and an arrangement for controlling an internal combustion engine having lean-burn operation, a device which sets the fuel-air mixture in the combustion chamber into increased motion being activated during enabled lean-burn operation, and the device being deactivated when a switchover is made from lean-burn operation to stoichiometric operation.

BACKGROUND INFORMATION

German Patent No. 44 18 112 implies that, particularly because of the reduction in fuel consumption, it is known to operate internal combustion engines at a stoichiometric air-fuel ratio ($\lambda=1$) only when a high output is desired—in the upper load range and at full load of the engine—however in the case of lower load and idling, to adjust a lean air-fuel ratio.

During lean-burn operation, the fuel is burned with an excess of air. However, with increasing excess air, the ignitability of the fuel-air mixture deteriorates. To assure reliable ignition of the lean mixture, devices are used which generate increased movement of the fuel-air mixture in the combustion chamber of the engine, and consequently improve the flammability. Such a device is known, for example, from European Patent No. 112 494 or German Patent No. 36 19 956. It is a device by which the valves of the combustion chamber are variably controllable, i.e., a turbulence of the mixture in the combustion chamber can be produced by a change in the valve positions.

The device for improving the movement of the fuel-air mixture in the engine combustion chamber is always activated when a switchover is made to lean-burn operation, and deactivated when there is a change from lean-burn operation to stoichiometric operation. Thus, there is an operating mode in which an intensified movement of the fuel-air mixture is taking place, and an operating mode in which the movement of the mixture is less. During the switchover between the two modes, mixture inhomogeneities occur which influence the output torque of the engine, which in turn means that the vehicle driving performance is impaired.

SUMMARY OF THE INVENTION

An object of the present invention is to provide for a method and an arrangement which ensure that the circuit-closing operation and the circuit-breaking operation of the device for increasing the mixture movement have as little influence on the engine torque as possible.

The objective is achieved in that after the device for increasing the movement of the fuel-air mixture is switched on, the fuel flow is reduced for a specifiable period of time, and after the device is switched off, the fuel flow is increased for a specifiable period of time. These measures ensure that a mixture which is too rich does not develop upon switching on the device for increasing the mixture movement, and a mixture which is too lean is not formed upon switching off the device. Thus, mixture inhomogeneities which influence the engine torque are reduced to a great extent.

It is advantageous that the beginning of the fuel reduction after the device for intensifying the mixture movement is switched on, and the beginning of the fuel increase after the device is switched off, is derived in each case from a characteristic which is a function of the engine speed, and that the measure for the fuel increase or fuel decrease is derived in each case from a characteristic which is a function of the engine speed.

DETAILED DESCRIPTION

The starting point is an engine which is operated with a stoichiometric fuel-air mixture only in the upper load range and at full load, but otherwise is operated with a lean mixture. In order to counteract the decrease in ignitability of a lean fuel-air mixture, provision is made for a device which sets the fuel-air mixture in the combustion chamber of the engine into increased motion, whereby the inflammability of the mixture improves. Thus, as soon as the engine switches over to lean-burn operation, this device is activated, and in response to the transition from lean-burn operation to stoichiometric operation, the device is deactivated again.

In response to the switch-on of the device for generating greater mixture movement, a reduced cylinder charge, thus a mixture which is too rich, results for a brief time. In response to the switch-off of the device, on the other hand, an increased cylinder charge, thus a mixture which is too lean, results for a brief time. These mixture inhomogeneities lead to a fluctuation in the engine torque. To reduce the influence of the switch-on or switch-off of the device on the engine torque, the enriching of the mixture after the device is switched on is counteracted by reducing the injected fuel quantity for a specifiable period of time. The short-term lean-making of the mixture after the device is switched off is compensated by increasing the injected fuel quantity for a specifiable period of time.

The control for the short-term decrease or increase of the fuel flow as a function of the switching-on or switching-off of the device for increasing the mixture movement will now be explained with reference to the flow chart shown in FIG. 1 and the timing diagram shown in FIG. 2.

A bit B_drk denotes the circuit-closing or circuit-breaking operation of the device, not shown, for increasing the mixture movement in the combustion chamber of the engine. As the timing diagram in FIG. 2 elucidates, initially bit B_drk is in the not set state, i.e. the engine is in lean-burn operation, and the device for increasing the mixture movement is switched on. At point of time t1, the engine goes over into an upper load range, and the lean-burn operation is switched over to stoichiometric operation; consequently, the device for increasing the mixture movement is switched off, and bit B_drk is set. After a certain time of stoichiometric operation, a switchover is carried out again at point of time t2 into the lean-burn operation, the device for increasing the mixture movement is switched on, and bit B_drk is consequently reset again.

Figure 1:
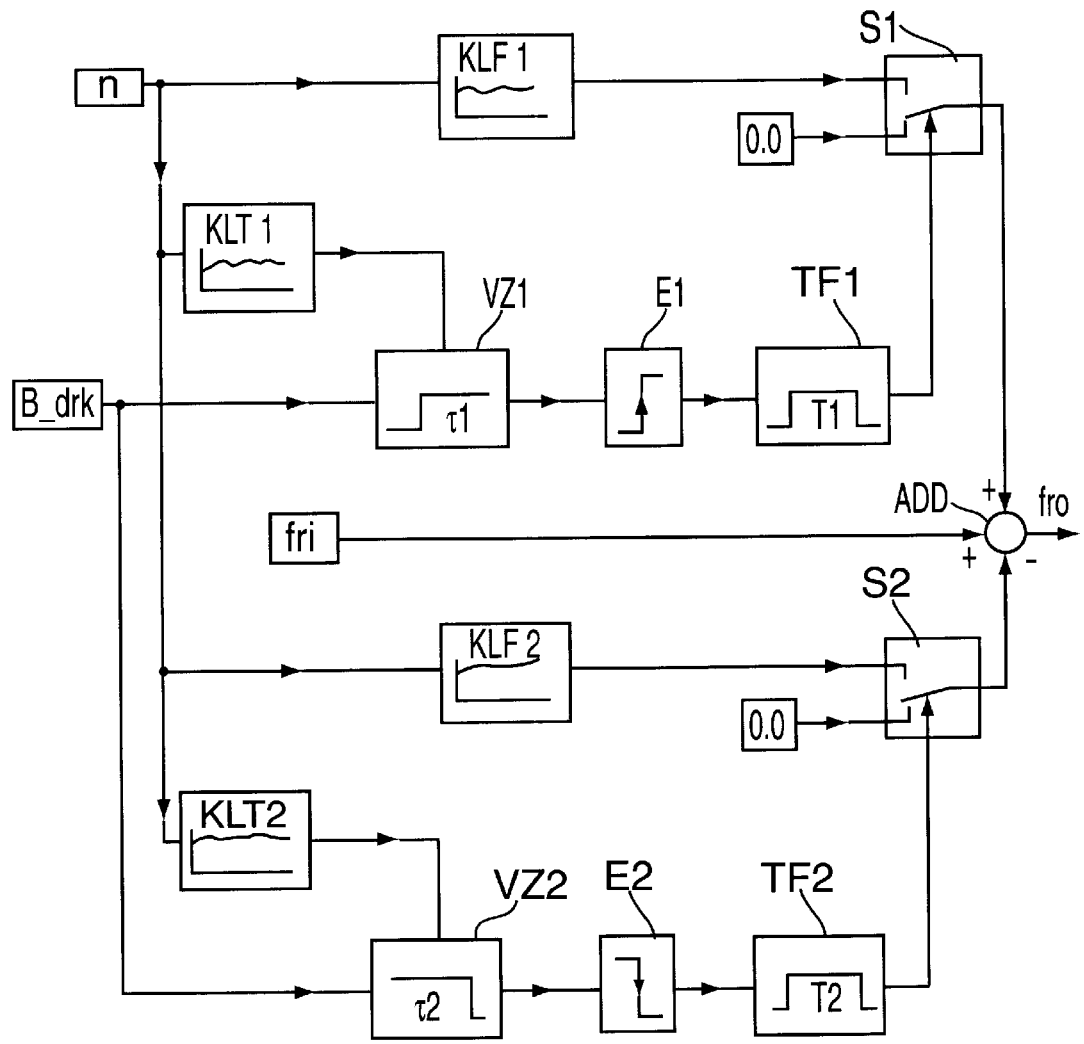
FIG. 1 shows a flow chart for calculating an added quantity or less quantity of fuel in response to switching on or switching off a device for increasing the mixture movement in the combustion chamber according to the present invention.

As FIG. 1 shows, described bit B_drk is applied to a first time-delay element VZ1 and a second time-delay element VZ2. Following first time-delay element VZ1 is a first discriminator stage module E1, and following second time-delay element VZ2 is a second discriminator stage E2. First discriminator stage E1 emits a signal at its output when a positive edge of bit B_drk appears, i.e., when the device for increasing the mixture movement is switched off. Second discriminator stage E2 only emits an output signal when a negative edge of bit B_drk appears, which is the case when the device for increasing the mixture movement is switched on.

A switch S1 is switched over by the output signal of discriminator stage E1, via a monostable flip-flop TF1, from a state 0.0 to the output of a switching block having a characteristic KLF1. After a delay time T1, flip-flop TF1 switches the switch back again to state 0.0.

Characteristic KLF1 furnishes, as a function of engine speed n, a measure for the increase in fuel flow which is necessary in order to counteract the mixture becoming lean after the device for increasing the mixture movement is switched off. The value derived from characteristic KLF1 is conducted via switch S1 to an interconnection point ADD, in which it is additively superimposed on a mixture factor fri. This mixture factor fri stands for the prevailing fuel-air mixture, in which the unwanted enrichment or lean-making of the mixture occurs immediately after the device for increasing the mixture movement is switched on or switched off.

If, on the other hand, second discriminator stage E2 detects a negative edge of bit B_drk, then a second monostable flip-flop TF2 switches over a second switch S2 from state 0 to the input of a switching block having the characteristic KLF2. Characteristic KLF2 indicates, as a function of engine speed n, a measure for the reduction in fuel flow immediately after the device for increasing the mixture movement has been switched on. For the period of time T2, in which monostable flip-flop TF2 has positioned switch S2 to the output of the switching block having characteristic KLF2, the value for the reduction in fuel flow derived from characteristic KLF2 is supplied to interconnection point ADD, and this value is subtracted from prevailing mixture factor fri.

Thus, in the case when the device for increasing the mixture movement is switched off, compensated mixture factor fro derivable at the output of interconnection point ADD is increased compared to prevailing mixture factor fri, and in the other case when the device is switched on, it is reduced.

Figure 2:
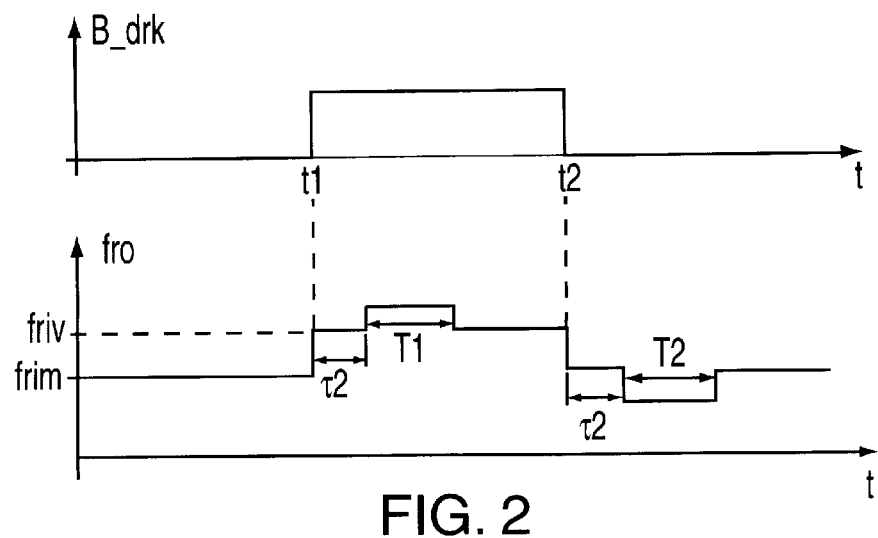
FIG. 2 shows a timing diagram of these switch-on and switch-off operations.

The mode of operation of the flow chart shown in FIG. 1 is clarified again by the timing diagram in FIG. 2. As the course of mixture factor fro at the output of interconnection point ADD shows, this mixture factor fro up to point of time t1 corresponds to a mixture factor frim in the lean-burn operation. At point of time t1, the switchover takes place from lean-burn operation to stoichiometric operation, i.e. mixture factor fro rises to mixture factor friv. After a delay time $\tau_1$, caused by first time-delay element VZ1, the increase in the mixture factor fro, gathered from characteristic KLF1, is carried out for period of time T1, predefined by monostable flip-flop TF1. Thus, the increase in mixture factor fro is not effected immediately with the switch-off of the device for increasing the mixture movement at point of time t1, but rather is delayed by a certain time $\tau_1$. This delay time $\tau_1$ is derived from a characteristic KLT1 which is a function of engine speed n.

If, in turn, a transition now takes place at point of time t2 into lean-burn operation, and thus the device for increasing the mixture movement is switched on, then after a delay time $\tau_2$, mixture factor fro is reduced at time T2, predefined by second monostable flip-flop TF2, by the value derived from characteristic KLF2.

Times $\tau_1$, T1 and $\tau_2$, T2, and the measure for the increase or decrease of the fuel flow during times T1 and T2 are optimized by characteristics KLF1, KLT1, KLF2, KLT2, such that the switchover from lean-burn operation to stoichiometric operation, and vice versa, has as little an effect on the engine torque as possible. While in the exemplary embodiment shown, in FIG. 1 the times T1 and T2 for the increase or decrease of the fuel flow are predefined by monostable flip-flops TF1, TF2, it is also possible to gather these times T1 and T2 from characteristics which are a function of the rotational frequency.

What is claimed is:

1. A method for controlling an internal combustion engine performing a lean-burn operation, comprising the steps of:
   (a) when the lean-burn operation is enabled, activating a device, the device increasing a motion of a fuel-air mixture in a chamber of the internal combustion engine;
   (b) after the device is activated, reducing a fuel flow for a first predetermined time period;
   (c) when a switchover is performed from the lean-burn operation to a stoichiometric operation, deactivating the device; and
   (d) after the device is deactivated, increasing the fuel flow for a second predetermined time period.

2. The method according to claim 1, further comprising the steps of:
   determining a first characteristic variable and a second characteristic variable as a function of an engine speed of the internal combustion engine;
   determining a first start time, when the fuel flow is reduced, as a function of the first characteristic variable; and
   determining a second start time, when the fuel flow is increased, as a function of the second characteristic variable.

3. The method according to claim 1, further comprising the steps of:
   determining a first measure variable and a second measure variable as a function of an engine speed of the internal combustion engine;
   determining a first amount of the fuel flow, when the fuel flow is reduced, as a function of the first measure variable; and
   determining a second amount of the fuel flow, when the fuel flow is increased, as a function of the second measure variable.

4. An arrangement for controlling an internal combustion engine performing a lean-burn operation, comprising:
   a device increasing a motion of a fuel-air mixture in the internal combustion engine when the lean-burn operation is enabled, the device deactivating the increased motion when the lean-burn operation is disabled; and
   a further arrangement reducing a fuel flow for a first predetermined time period after the device is switched on, and increasing the fuel flow for a second predetermined time period after the device is switched off.

* * * * *